United States Patent
Maus

[11] Patent Number: 5,652,563
[45] Date of Patent: Jul. 29, 1997

[54] SAFETY SYSTEM FOR A HORSE STABLE

[76] Inventor: Andrew B. Maus, 13501 Falls Rd., Hunt Valley, Md. 21030

[21] Appl. No.: 551,354

[22] Filed: Nov. 1, 1995

[51] Int. Cl.$^6$ .................................................. G08B 25/00
[52] U.S. Cl. ........................... 340/290; 340/628; 119/773; 49/31
[58] Field of Search ............................ 340/290, 286.05, 340/573, 628, 629; 119/772, 773; 49/379, 31

[56] References Cited

U.S. PATENT DOCUMENTS

| | | |
|---|---|---|
| 406,629 | 7/1889 | Coulter . |
| 703,372 | 7/1902 | Beisel . |
| 1,006,914 | 10/1911 | Cox ................................. 119/773 |
| 1,449,954 | 3/1923 | Radoush ......................... 119/773 |
| 1,807,121 | 5/1931 | Loeffler . |
| 2,193,257 | 3/1940 | Steele ............................. 119/15.5 |
| 2,297,875 | 10/1942 | Cormier ............................. 39/17 |
| 3,207,273 | 9/1965 | Jurin ................................. 189/49 |
| 3,258,875 | 7/1966 | Ulman ............................. 49/379 |
| 3,383,796 | 5/1968 | Frederick, Jr. et al. ............... 49/7 |
| 3,438,147 | 4/1969 | Lander ................................. 49/7 |
| 3,456,389 | 7/1969 | Dean ............................... 49/253 |
| 3,735,840 | 5/1973 | Sheperd ............................ 185/39 |
| 3,760,535 | 9/1973 | Trulaske .......................... 49/379 |
| 3,777,423 | 12/1973 | Coulter et al. ..................... 49/31 |
| 3,877,174 | 4/1975 | McDonald ........................ 49/334 |
| 3,905,063 | 9/1975 | Coulter et al. ................... 16/48.5 |
| 3,908,309 | 9/1975 | Coulter et al. ..................... 49/31 |
| 4,034,437 | 7/1977 | Robertson et al. ............... 16/48.5 |
| 4,040,143 | 8/1977 | Lasier et al. ..................... 16/48 J |
| 4,054,008 | 10/1977 | Phillips ............................... 49/31 |
| 4,185,415 | 1/1980 | LaConte .......................... 49/248 |
| 4,338,526 | 7/1982 | Martin et al. .................... 307/116 |
| 4,365,250 | 12/1982 | Matsuoka et al. ........... 340/825.32 |
| 4,428,278 | 1/1984 | Sutton ................................ 49/31 |
| 4,464,651 | 8/1984 | Duhame .......................... 340/521 |
| 4,539,555 | 9/1985 | Tefka ............................... 340/500 |
| 4,598,494 | 7/1986 | Tsuji et al. .......................... 49/2 |
| 4,706,413 | 11/1987 | James .............................. 49/477 |
| 4,738,052 | 4/1988 | Yoshida ............................. 49/31 |
| 4,785,293 | 11/1988 | Shearer et al. .................. 340/628 |
| 4,819,551 | 4/1989 | Vole .............................. 98/42.04 |
| 4,912,878 | 4/1990 | Bentley ............................ 49/379 |
| 5,044,680 | 9/1991 | Baker et al. ..................... 292/278 |
| 5,072,973 | 12/1991 | Gudgel et al. ..................... 292/55 |
| 5,140,173 | 8/1992 | Chau et al. ...................... 307/125 |

*Primary Examiner*—Jeffery Hofsass
*Assistant Examiner*—Anh La
*Attorney, Agent, or Firm*—Leonard Bloom

[57] ABSTRACT

A safety system for a stable comprises "smart detectors" installed in the stable for detecting at least one abnormal condition in the stable, a siren and/or flashing strobe installed in each stall for spooking horses out of their stalls, an electro-magnetic lock provided on each said door, a power source supplying power to each said electro-magnetic lock keeping each door closed in the absence of the abnormal condition, and a controlling means continually monitoring said "smart detectors". Once the abnormal condition has been detected, the controlling unit immediately turns down the power supplied to each electro-magnetic lock and, with a certain delay, actuates the siren and/or flashing strobe.

35 Claims, 6 Drawing Sheets

SAFETY SYSTEM FOR A HORSE STABLE

BACKGROUND OF THE INVENTION

The present invention relates to a safety system, and more particularly, to an improved system for the safety of purebred animals, and particularly, purebred horses in case of a sudden stable fire.

A problem of saving lives of horses if a fire happened in a stable is a serious one. As reported in "The Baltimore Sun" and "USA Today" on Aug. 1, 1995, a "fire engulfed a barn at Ellis Park race track in Henderson, Ky., killed as many as twenty five thoroughbreds". Unfortunately, this is not the only tragic fire taking away lives of animals. The problem has been recognized, and some measures (sprinklers, rewiring, etc.) have been undertaken; however, long felt and unsolved need for a solution to this problem still remains in the field.

Typically, a stable includes several horse stalls. If the fire happened at least in one stall, doors of all stalls should be immediately opened in order to release the horses. Unfortunately, there is a certain time delay between the fire happening and a personnel to realize the fire and to undertake actions for releasing the horses.

A mechanism for automatically releasing horses by the electric fire-alarm impulse is described in U.S. Pat. No. 406,629 (patented on Jul. 9, 1889). This mechanism does not, however, employ state-of-the-art detection and controlling systems, therefore, a certain time delay may be experienced in responding of the door actuating mechanism to the abnormal conditions in the stable.

Control systems are known which automatically release doors in garages or buildings, such as hotels or offices, in response to abnormal inside conditions, such as a dangerous level of smoke or fire, etc., detected by detectors. People alerted by alarm can immediately leave buildings. These systems are disclosed, for instance, in U.S. Pat. Nos. 4,040,143; 4,338,526; 4,365,250; 4,464,651; 4,539,555; 5,044,680 and 5,140,173.

None of the above-described safety systems are known to be employed in stables. Disadvantageously, even if employed, these control systems will not eliminate completely the problems of saving horse's lives once the fire happened. The thing is, as a sequence of a horse's behavior pattern in a fire situation, the animal may respond to the fire by "hiding" in its stall even if the door of the stall is open, thereby making the control systems of the prior art useless for the situation in question.

Therefore, a fire in horse stables is of a serious concern, for horses' owners, racetracks, horse farms, insurance companies insuring horses, and the like.

It would be highly desirable to provide a safety system for a horse stable which would be efficient in solving the problem of saving horses lives in the event of a sudden fire in the stable.

BRIEF SUMMARY OF THE INVENTION

It is, therefore, an object of the present invention to provide an efficient safety system for purebred animals stable, which would help to save lives of the purebred animals, particularly, lives of horses.

It is another object of the present invention to provide a safety system employing "Smart Detectors" for a horse stable which would monitor atmosphere in the stable, simultaneously open doors of stalls immediately upon detecting abnormal conditions and "spook" horses out of their stalls.

The present invention may find its particular utility in horse stables, having a plurality of stalls provided with doors, however, it can be also useful for saving lives of any purebred animals in case of sudden fire (or other dangerous conditions) inside a compartment wherein the purebred animals are accommodated.

In accordance with the teaching of the present invention, a safety system to be installed in the stable comprises detectors (an ionization smoke detector, a photo-electric smoke detector and a heat detector) for detecting at least one abnormal condition in the stable and an irritant means (an audio irritant means, and/or a visual irritant means) installed in each stall for spooking horses out of their stalls. The detectors are installed in several places of the stable, for example, accordingly to NFPA (National Fire Protection Association), under the roof of the stable, in order to monitor the overall atmosphere in the stable.

Preferably, the door in each stable is a gravity door, with a spiral metal hinge. An electro-magnetic lock is provided on each door at the stall. A power source supplies power to each electro-magnetic lock, keeping each door closed in the absence of at least one abnormal condition. The power source may be either an AC or DC source of power. It is mandatory, that a battery back-up is provided in the system.

As a crucial element of the safety system of the present invention, a controlling unit continually monitors all detectors installed in the stable, and, once at least one truthful abnormal condition has been detected, immediately turns down the power supplied to each electro-magnetic lock and actuates the irritant means, thereby immediately opening the doors and spooking horses out of their stalls, and thereby saving their lives.

Each door is also provided with a push button for manually opening the door.

Viewing in another aspect, the present invention is a method for saving lives of purebred animals in a fire situation in a stable for purebred animals, wherein a plurality of the purebred animals are accommodated in their respective stalls. Doors in all stalls should be opened immediately to release the purebred animals, such that a certain delay in opening all the doors by a personnel and reluctance of the animals to leave their stalls, leading to death of the animals, is overcome and avoided. A safety system should be installed in the stable, including "smart detectors" installed in the stable for detecting at least one abnormal condition in the stable; an irritant means installed in each stall for spooking horses our of their stalls; and a controlling unit continually monitoring the detectors. Each door is provided with an electro-magnetic lock supplied with power for keeping each door closed in the absence of at least one abnormal condition. The controlling unit immediately turns down the power supplied to each electro-magnetic lock and actuates the irritant means, once at least one truthful abnormal condition is detected, thereby immediately opening the doors and spooking horses out of their stalls, and thereby saving their lives.

Preferably, the detector means may include an ionization smoke detector, a photo-electric smoke detector and a heat detector.

The irritant means may include a siren and/or a flashing strobe.

These and other objects of the present invention will become apparent from a reading of the following specification taken in conjunction with the enclosed drawings.

DESCRIPTION

Figure 1:
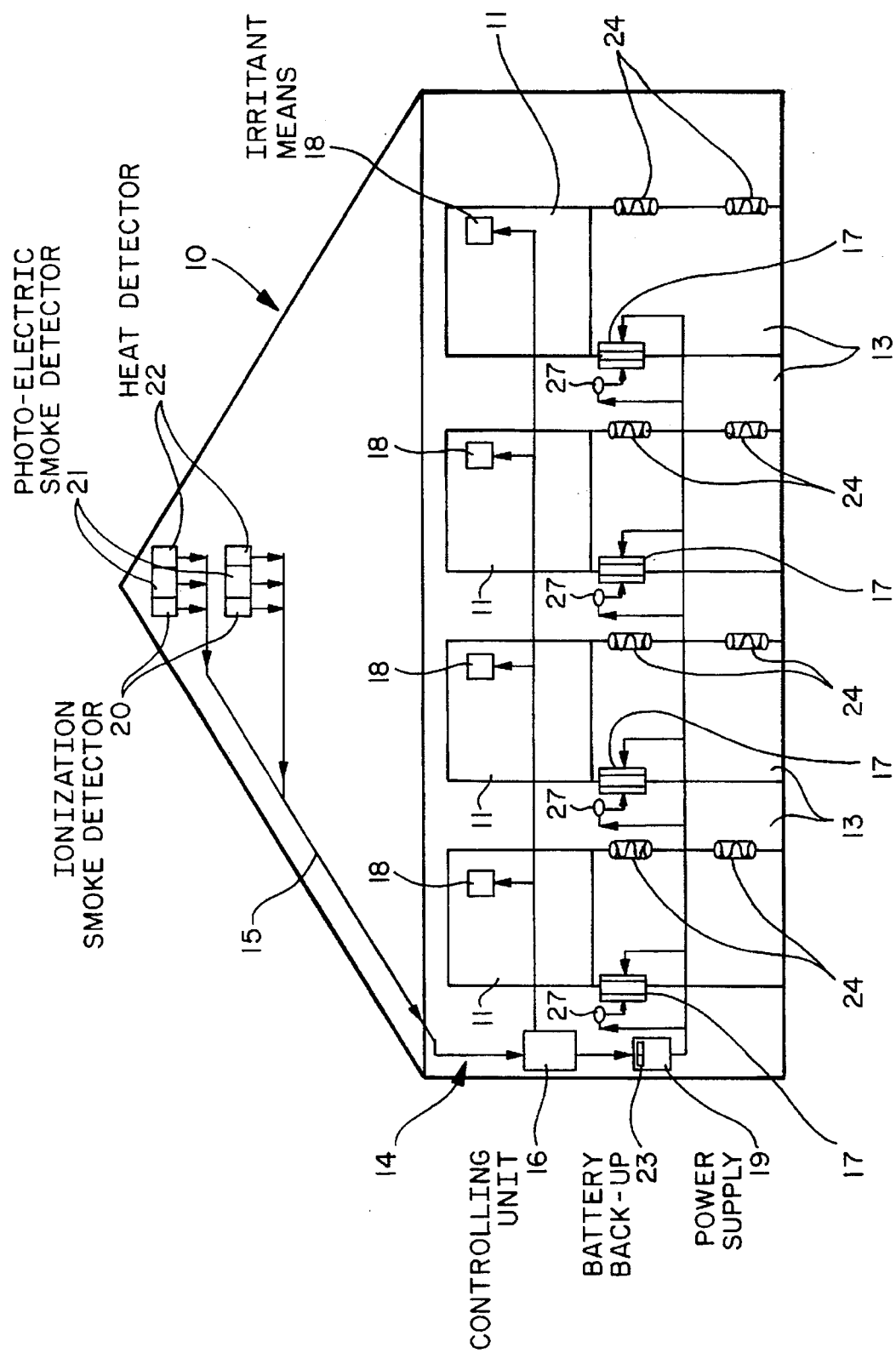
FIG. 1 shows schematically a perspective view of a stable of the present invention.

With reference to FIGS. 1–6, a stable 10 includes a plurality of stalls 11. A purebred animal, particularly, a racing horse 12, is accommodated in a respective stall 11. A door 13 in each stall 11, which is usually closed, prevents the horse 12 from leaving its stall 11. Fire safety of the racing horses in their stables is a big concern and a serious problem. Typically, the stable includes 20–100 stalls with valuable and expensive purebred horses. If a fire happens in at least one stall, it can be spread quickly and the stable can be burned down in a matter of minutes. Many horses may die in the fire. Also, a human risk during the fire is very high.

The process of having to unlock and open of 20–100 stalls is very time consuming. Besides, the horses "believe" that the safest place in the barn is in their stalls and, once the fire happened, they "hide" in their stalls. In order to save a horse, the attendants should open the door and bring the horse out of the stall. The attendants on duty, of course, do not have time to open doors in all stalls and to retrieve all horses before the flames engulfed the stable.

A safety (or fire releasing) system 14 of the present invention is to be installed in the stable 10 for immediate releasing of all horses 12, once a fire situation occurred in the stable 10. It is accomplished by opening all doors 13 in stalls 11 simultaneously and immediately as a fire condition is detected and by simultaneous "encouraging" the horses to leave their stalls.

The safety system 14 comprises the following main elements: a fire detection system 15, a controlling unit 16, a plurality of electro-magnetic locks 17 on doors 13, an irritant means 18 in each stall, and a power supply 19.

As best shown in FIG. 1, the fire detection system 15 includes a plurality of "smart detectors" monitoring the overall atmosphere in the stable 10 for characteristics of fire in order to detect at least one abnormal condition in the stable 10. "Smart detectors" (ionization smoke detector 20, photo-electric smoke detector 21, and heat detector 22) are installed in the stable 10 accordingly to UL (Underwriters Laboratory) and NFTA standards in order to diversify the alarms detection abilities enough to curtail false alarms. "Smart detectors" are the mechanisms that use dual sensors, such as ionization and photo-electric sensors. In combination, both types of sensors would have to be triggered in order for the alarm to be activated. This will cut down on false alarms.

Figure 2:
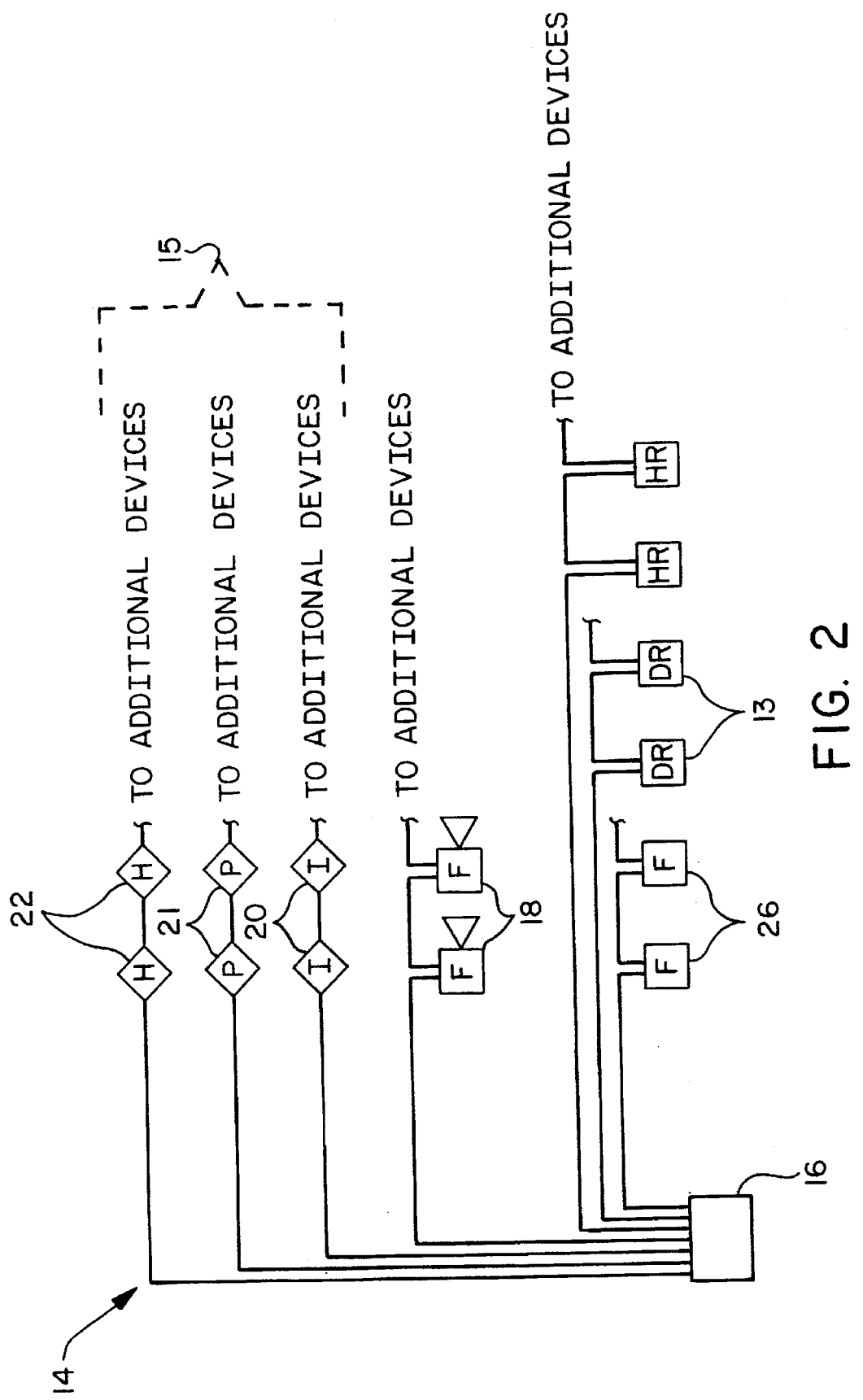
FIG. 2 shows a wiring diagram of a door releasing mechanism of the present invention.
Figure 3:
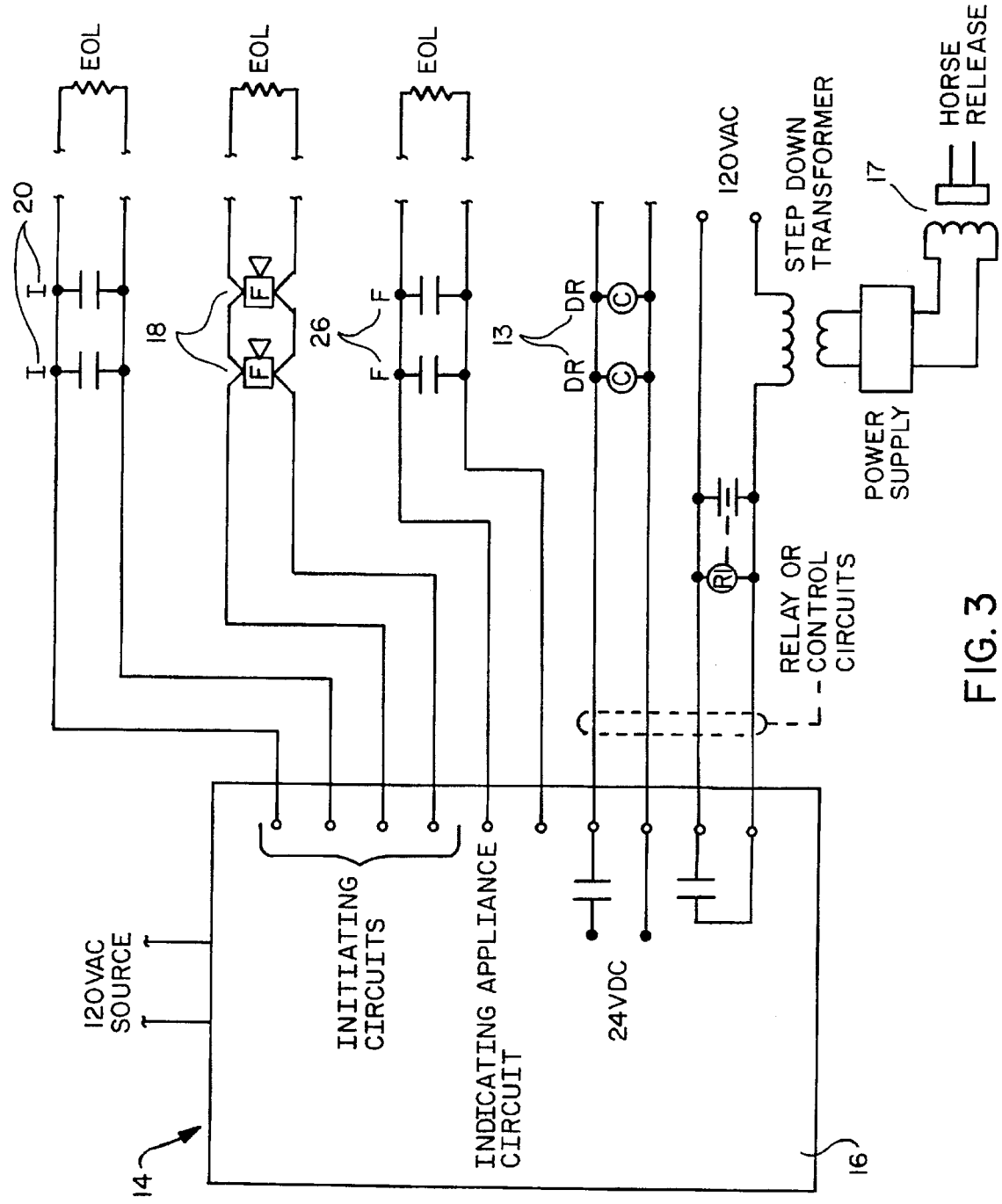
FIG. 3 shows a schematic diagram of a door releasing mechanism of the present invention.

As best shown in FIGS. 1–3, the controlling unit 16 continually monitors all detectors 20, 21, 22 in the stable 10 for abnormal conditions and analyses situation in the stable. The controlling unit 16 also continually monitors the doors 13, the power supply 19, the irritant means 18 and the battery back-up 23. As soon as the abnormal condition, such as, for instance, a dangerous level of smoke or heat increase, and the like, has been detected, the controlling unit 16 immediately turns down a power supplied to the electro magnetic locks 17 such that the magnetic hold will cease and the doors 13 will open, thereby giving to all horses 12 an exit from their stalls 11.

In order to encourage (or to spook out) the horses 12 to leave their stalls 11, the controlling unit 16 actuates the irritant means 18 to generate audio or visual signal(s) spooking the horses out of their stalls 11.

Figure 4:
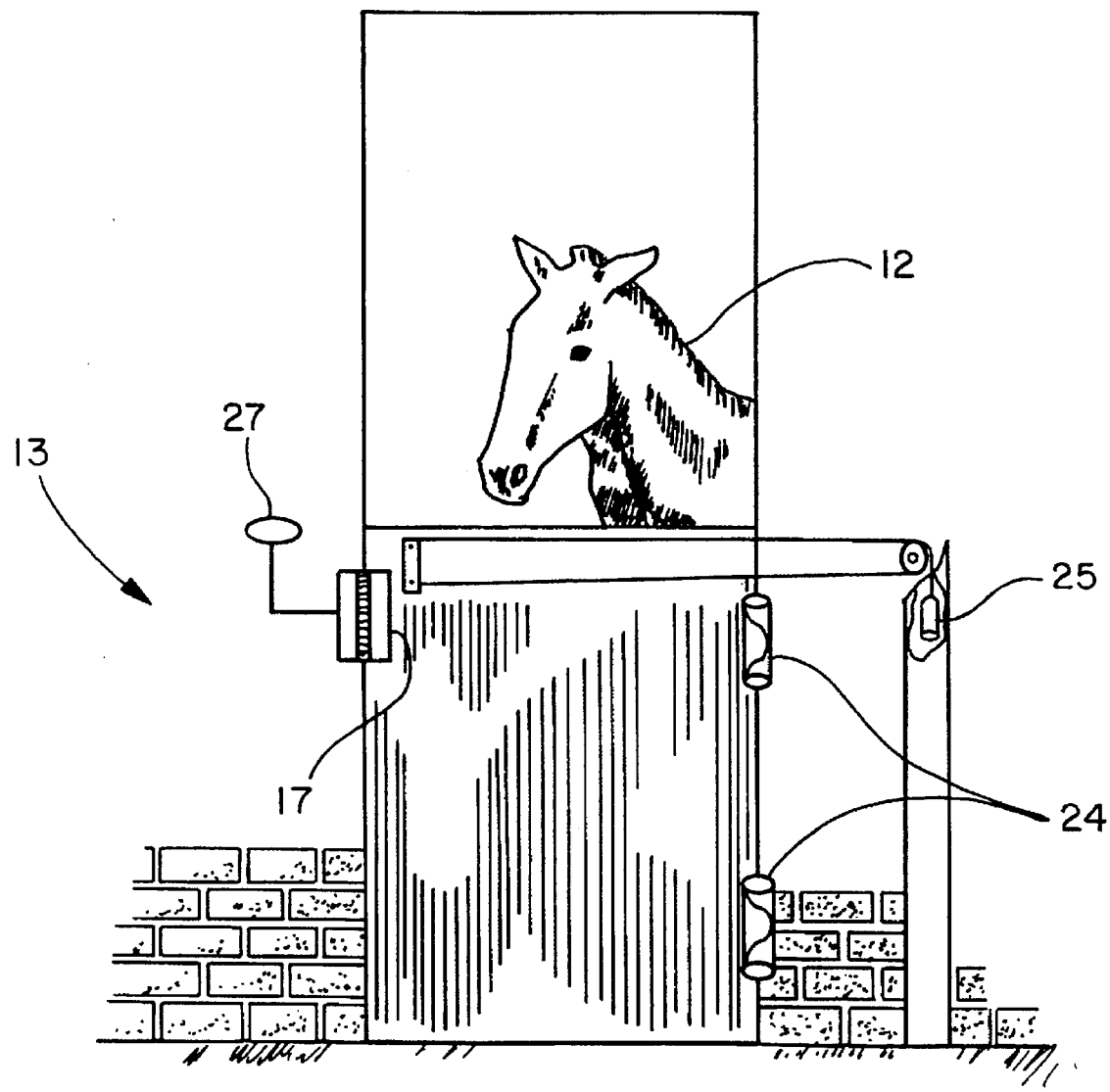
FIG. 4 shows schematically a closed gravity-type swinging door.
Figure 5:
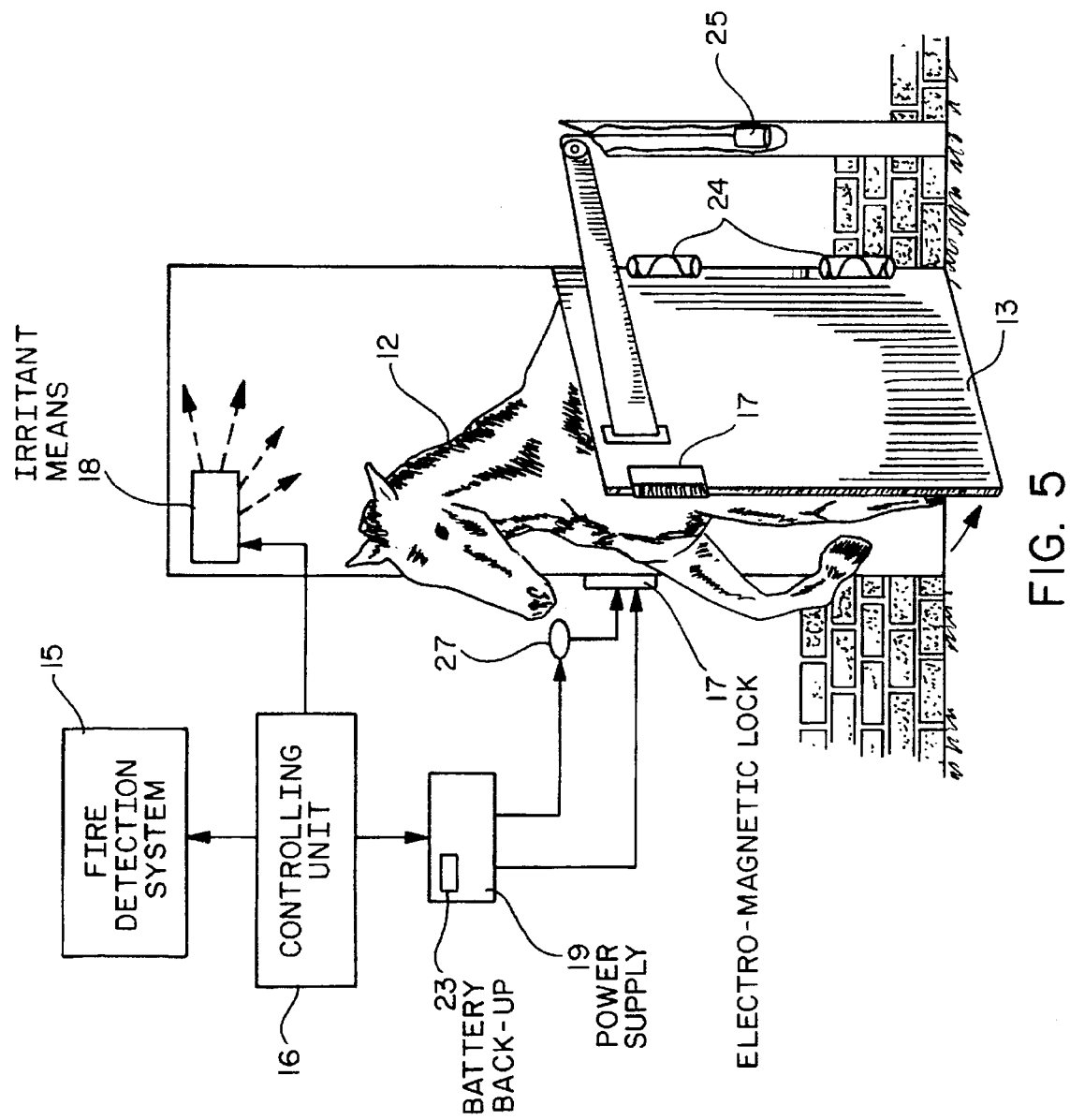
FIG. 5 shows schematically the door of the FIG. 4 opened once a fire happened.
Figure 6:
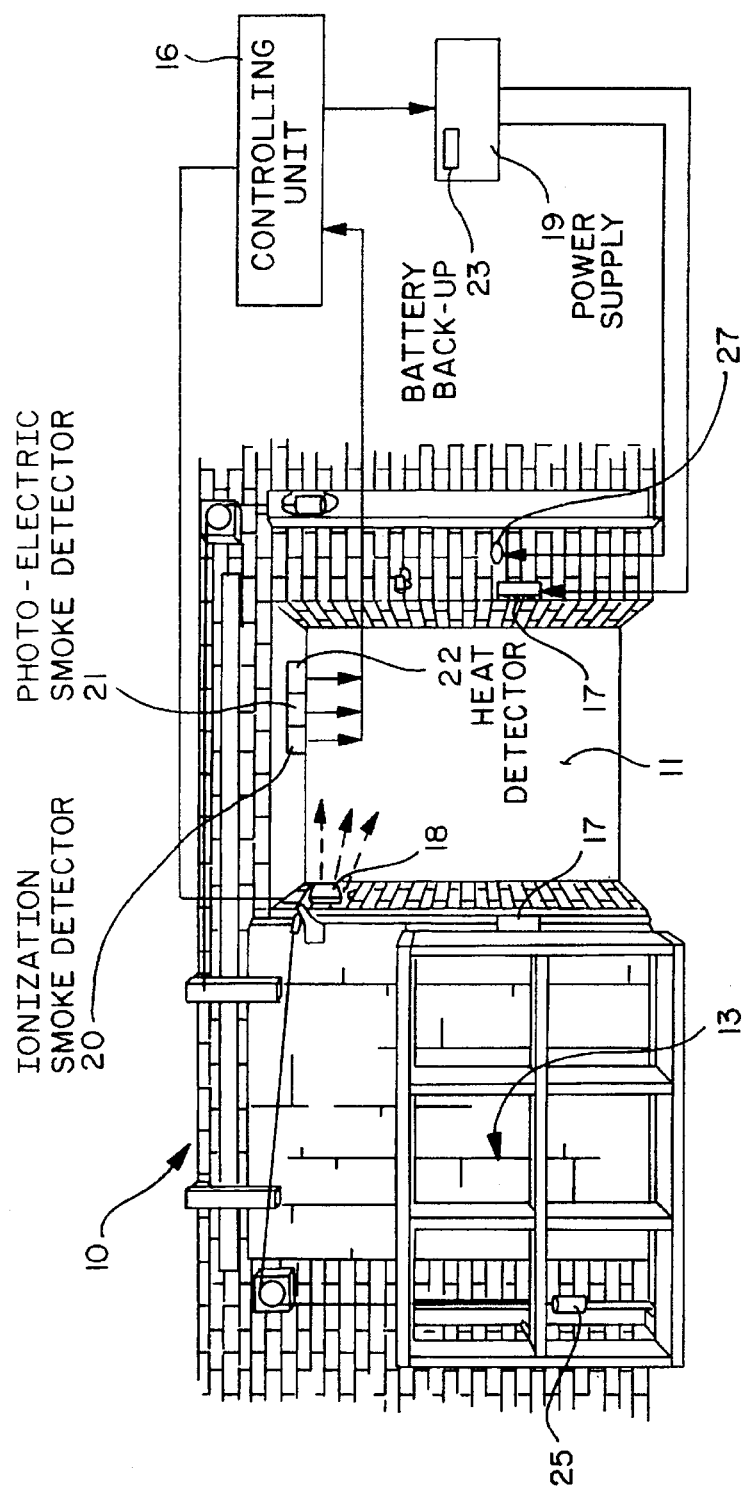
FIG. 6 shows the gravity-type sliding door opened once a fire happened.

Although not limited to, the doors 13, as best shown in FIGS. 4–6, are typical gravity-type doors, and can be either swinging or sliding doors.

Each swinging door 13 is normally urged to is "open" position by a spiral metal hinge 24 and a weight 25 which is part of a gravity system (schematically shown). Each spiral metal hinge 24 is biased to open the door 13 and hold it in the "open" position. When the door 13 is held in the "close" position by the energized electro-magnetic lock 17 (against the action of the spiral 24 and the weight 25), the energies of the spiral 24 and the weight 25 are stored and their forces are balanced by the magnetic attraction force of the electro-magnetic lock 17. Once the electro-magnetic lock 17 is being de-magnetized, the holding magnetic force ceases, and the stored energies of the spiral 24 and the weight 25 are released, thereby causing opening of the door 13, which remains open due to the action of the spiral 24 and the weight 25. For sliding door 13 more sophisticated types of opening mechanisms would be used. Other types of opening mechanism also can be used in the system.

The solenoid lock may be used in the system. Solenoid locks have a steel rod which acts as the locking deterrent, which in case of fire will be detracted from its housing allowing the door 13 to open.

The controlling unit 16 may release all doors 13 throughout the stable 10 simultaneously. As an alternative, the releasing can be customized to a certain order, when all doors 13 are sectioned off in zones, and the doors in one zone are released after the doors in another zone have been released. The controlling unit 16, which is an intelligent electronic unit, making all decision with no human involvement, provides analysis of the situation and, in the case of fire, determines which zone is most dangerous and vulnerable, and commands to release the doors in this the most dangerous zone. The controlling unit 16 can also be customized to release and relock doors 13 on a time command, and has an automatic reset.

The power supply (or power source) 19 can be a 1 2DC, 24 DC or AC power supply. The battery back-up 23 is a mandatory element of the safety system 14 in order to preclude failure of the latter it the main power supply 19 fails.

As best shown in FIGS. 2 and 3, the controlling unit 16, which is a microprocessor based, point identified intelligent system, continuously monitors the sensitivity of all installed analog detectors 20, 21, and 22 to measure any change in their sensitivity due to the environment in the stable 10.

The following identifications are made in FIGS. 2 and 3:

F—pull station

I—ionization smoke detector

DR—door (gate) release

HR—horse release

P—photo-electric smoke detector

H—heat detector

C—coil or active device.

It will be appreciated by those skilled in the art, that "Door Release" stands for the mechanism used to open either outward swinging or sliding stable doors 13 that will be activated manually or automatically by the fire alarm control panel or by people.

There is a certain delay between the "door release" and the "horse release". Once the system is activated and doors are in the "open position", the noise irritant will be activated on a delay, since, preferably, the horses are not spooked, while they are still trapped in stalls. This time delay most likely would cut down on unwanted avoidable injuries.

The drift compensation software overcomes effects of aging or environment on sensor sensitivity giving a dependable alarm threshold. "Dirty" and "Excessively Dirty" indicators are activated when a sensor drifts beyond acceptable limits. Sensors can automatically change sensitivity with time of day to be "matched" to their real-life environment.

Signal processing for alarm verification is also built in to the system to provide a greater immunity to false alarms. The system can address as many detectors as needed for obtaining a "clear picture" of the situation in the stable 10.

The software of the controlling unit 16 automatically adjusts each detector approximately once per week for changes in sensitivity due to the effects of component aging or environment, for example, dust and the like. By maintaining the actual detector sensitivity under adverse conditions, the system can dependably respond to actual alarm conditions while ignoring the factors which generally contribute to nuisance alarms. This dependability is further enhanced with "Dirty" and"Excessively Dirty" trouble indications, and identifies the specific device when the monitoring unit 16 has to compensate a smoke sensor beyond its acceptable limits.

Provisions is made for the system 14 which provides a printed record of events and a visual display of events.

The Alarm Verification feature for all detectors 20–22 allows to avoid unwanted alarms by operating with the following sequence: In the event the detector alarms, a distinctive pre-alarm message will be displayed for 25 seconds. The system will then remain in the verification mode for a period of approximately 85 seconds. If the detector which generated the alarm (or any other detector), alarms within this period, a system alarm will occur. If no alarm occurs within this period, the system will return to a normal condition.

The visual and audio/visual irritant means (horn) 18 may be either surface, flush or semi-flush mounted. The horn 18 may be used in conjunction with a cover, which may be plain or strobe-equipped, surface or flush.

The strobe cover mounts directly to a basic horn mechanism. An independent strobe box can also be used. The strobes contain a xenon flash tube, are front mounted and visible from all sides of the lens. The white high impact, Lexan® lens is silkscreened "FIRE" or "HALON" in ½ inch high red letters. The high intensity strobe has a clear front diffuser bar and is intended for indoor use.

The DC horn, strobe and horn/strobe are electrically polarized for to a supervised indicating appliance circuit. Screw terminals insure proper "in and out" wiring supervision of the horn, while the strobe has wire leads separate from the horn so it can be connected to other circuits if desired. In addition, the D.C. horns include noise cancelling circuitry to prevent the transmission of high voltage spikes that are typically generated by contact type electromechanical devices.

As above described, the irritant means 18 provides that the horses are spooked out of their stalls 11. The horn output is usually 87 dB/95 dBA and the effective candlepower is of 4.5 to 120.

Although not limited to, the controlling unit 16 may be of FCID-A™ series manufacturing by FCI™ Fire Control Instruments. Also, the following sensors for the fire detection system 15 may be used: analog ionization smoke sensor ASD, analog photoelectronic smoke sensor ASD-P and analog thermal sensor ATD.

Weatherproof manual Fire Alarm Station (pull station) 26 of MS-WS series manufactured by FCI™ Fire Control Instruments can be used in the present invention.

The pull station 26 is manufactured in a cast aluminum housing with a bright, for instance, red, finish and raised white letters to assure fast recognition in fire emergencies. The surface mounted unit has a protective hood over the actuation door which offers weatherproof operation, especially in climates where ice coating may present problems. The pull door is held in place by a breakglass rod. The pull door extends slightly below the body of the station so that it may be actuated by a mitten-clad hand in severe winter climates. The station features a key operated reset action for positive resetting. The surface mount backbox is threaded for ½ inch conduit fittings on both top and bottom.

The pull station 26 is operated by pulling the bottom 27 of the pull door outward. The pull door shields the operator from broken particles of glass and prevents jamming. After the alarm has been sounded, the door will remain forward to give visual indication that the station has been operated. Reset is accomplished with a key which is common to the FCI™ control panel. This method makes it impossible to reset by accident or by an unauthorized individual.

As best shown in FIGS. 1 and 4–6, the door 13 can be a sliding (FIG. 6) or typical swinging gravity-type door, having the electro-magnetic lock 17 which is energized to keep the door closed if there is no fire situation (FIG. 4). If the fire happened, the controlling unit 16 turns the power supplied to the electro-magnetic lock 17 out, and the door 13 opens (FIG. 5). The door has spiral metal hinges 24 which uses the weight of the door along with the pull of gravity to open the stable doors 13 and to keep them open once the magnetic hold ceases.

The advantage of having the system 14 of the present invention, installed in a stable, is to increase the chances for allow the horses life to be spared. The system will increase the horses survival rate by a substantial amount, thereby decreasing the owners insurance premiums.

The insurance companies who are involved in the horsing industry, will benefit from this system by having a lower number of mortality insurance claims filed. In the past decade the owners suffered the loss of major tax shelters, which was a leading catalyst for the wealthy investing in the horsing industry. It is estimated that about five percent of all horsing insurance claims are fraud, and on the rise. As insurance companies in this industry take more precautions against insurance fraud, this system will help companies stem some of the problems.

Another advantage of the system involves the human factor, which takes into consideration the amount of human risk during a fire. At most of the larger horse farms in the industry, there are attendants taking care of the horses around the clock. If a fire were to break out in the stables, the system would take care of releasing and opening the stable doors. This process of having to unlock and open of 20–100 stalls is at the very least time consuming. The system would therefore reduce the amount of human risk and help a person to get into a stall and get the horse out of the stall as quickly as possible.

Although described particularly as a safety system for horses burns, the system may find its utility as fire releasing system for saving lives of purebred animals and live-stock.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A safety system for a stable, wherein the stable includes a plurality of stalls, and wherein each stall has a door, the safety system, comprising:

a detector means installed in the stable for detecting at least one abnormal condition in the stable;

an irritant means installed in each stall for spooking horses out of their stalls;

an electro-magnetic lock provided on each said door;

a power source supplying power to each said electro-magnetic lock keeping each door closed in the absence of said at least one abnormal condition; and a controlling means continually monitoring said detector means and immediately turning down the power supplied to each said electro-magnetic lock and actuating the irritant means, once said at least one abnormal condition has been detected, thereby immediately opening the doors and spooking horses out of their stalls once the doors have been opened, and thereby saving their lives.

2. The safety system of claim 1, wherein the detector means is a smart detector including an ionization smoke detector and a photo-electric smoke detector.

3. The safety system of claim 1, wherein the detector means includes a heat detector.

4. The safety system of claim 1, wherein the irritant means includes an audio irritant means.

5. The safety system of claim 1, wherein the irritant means includes a visual irritant means.

6. The safety system of claim 1, wherein the power source includes an AC source.

7. The safety system of claim 1, wherein the power source includes a DC source.

8. The safety system of claim 1, wherein the power source includes a battery back-up.

9. The safety system of claim 1, wherein the door is a gravity door.

10. The safety system of claim 1, wherein the door is provided with a spiral metal hinge.

11. The safety system of claim 1, wherein each door is provided with means for manually opening the door.

12. The safety system of claim 1, wherein all doors in the stable are opened simultaneously.

13. The safety system of claim 1, wherein all doors in the stable are sectioned off in zones and the doors are opened in a certain order.

14. The safety system of claim 1, wherein the irritant means is actuated with certain delay after the door in the stall is opened.

15. In a stable for purebred animals, wherein a plurality of the purebred animals are accommodated, each one in a respective stall, wherein each stall has a door, wherein in a case of a fire doors in all stalls should be opened immediately to release the purebred animals, wherein a certain delay in opening the doors in all stalls by a personnel and reluctance of the animals to leave their stalls may lead to death of the animals, an improvement comprising the safety system installed in the stable, including:

a detector means installed in the stable for detecting at least one abnormal condition in the stable;

an irritant means installed in each stall for spooking horses out of their stalls;

an electro-magnetic lock provided on each said door;

a power source supplying power to each said electro-magnetic lock keeping each door closed in the absence of said at least one abnormal condition; and a controlling means continually monitoring said detector means and immediately turning down the power supplied to each said electro-magnetic lock and actuating the irritant means, once said at least one abnormal condition has been detected, thereby immediately opening the doors and spooking horses out of their stalls, and thereby saving their lives.

16. The improvement of claim 15, wherein the detector means includes an ionization smoke detector, a photo-electric smoke detector and a heat detector.

17. The Improvement of claim 15, wherein the irritant means includes a siren and a flashing strobe.

18. The improvement of claim 15, wherein the power source includes an AC source.

19. The improvement of claim 15, wherein the power source includes a DC source.

20. The improvement of claim 15, wherein the power source includes a battery back-up.

21. The improvement of claim 15, wherein the door is a gravity door, provided with a spiral metal hinge.

22. The improvement of claim 15, wherein each door is provided with means for manually opening the door.

23. The improvement of claim 15, wherein all doors in the stable are opened simultaneously.

24. The improvement of claim 15, wherein doors in the stable are opened in a certain order.

25. The improvement of claim 15, wherein the controlling means actuate the irritant means with certain delay after the power supplied to the lock has been turned down.

26. In a stable for purebred animals, wherein a plurality of the purebred animals are accommodated, each one in a respective stall, wherein each stall has a door, and wherein a certain delay in opening the doors in all stalls by a personnel and reluctance of the animals to leave their stalls may lead to death of the animals, a method for saving lives of the purebred animals, comprising he steps of: providing and installing a safety system in the stable, wherein the safety system includes a detector means for detecting at least one abnormal condition in the stable, an irritant means in each stall for spooking horses out of their stalls, an electro-magnetic lock on each said door, a power source supplying power to each said electro-magnetic lock and keeping each door closed in the absence of said at least one abnormal condition, and a controlling means continually monitoring said detector means;

wherein, once at least one said abnormal condition has been detected, the controlling means immediately turns down the power supplied to each said electro-magnetic lock and, with a certain delay, actuates the irritant means, thereby immediately opening the doors and encouraging horses to leave their stalls, and thereby saving their lives.

27. The method of claim 26, wherein the detector means includes an ionization smoke detector and a photo-electric smoke detector.

28. The method of claim 26, wherein the irritant means includes a siren and a flashing strobe.

29. The method of claim 26, wherein the power source includes an AC source.

30. The method of claim 26, wherein the power source includes a DC source.

31. The method of claim 26, wherein the power source includes a battery back-up.

32. The method of claim 26, wherein the door is a gravity door, provided with a spiral metal hinge.

33. The method of claim 26, wherein each door is provided with means for manually opening the door.

34. In a stable for purebred animals, wherein a plurality of the purebred animals are accommodated, each one in a respective stall, wherein each stall has a door, wherein in a case of a fire doors in all stalls should be opened immediately to release the purebred animals, wherein a certain delay in opening the doors in all stalls by a personnel and reluctance of the animals to leave their stalls may lead to death of the animals, an improvement comprising the safety system installed in the stable, including:

smart detectors installed in the stable for truthful detecting of at least one abnormal condition in the stable;

a siren and a flashing strobe installed in each stall for spooking horses out of their stalls;

an electro-magnetic lock provided on each said door;

a power source supplying power to each said electro-magnetic lock keeping each door closed in the absence of said at least one abnormal condition, the power source includes either an AC source, a DC source, and a battery back-up;

a controlling means continually monitoring said detectors and immediately turning down the power supplied to each said electro-magnetic lock and, with a certain delay, actuating the siren and the flashing strobe, thereby immediately opening the doors and spooking horses out of their stalls, and thereby saving their lives.

35. The improvement of claim 34, wherein the door is a gravity door, provided with a spiral metal hinge and with means for manually opening the door.

* * * * *